United States Patent
Fielding

(10) Patent No.: US 6,857,680 B2
(45) Date of Patent: Feb. 22, 2005

(54) INTEGRATED STEP FOR A VEHICLE CARGO AREA

(75) Inventor: Russell C Fielding, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/624,182

(22) Filed: Jul. 22, 2003

(65) Prior Publication Data

US 2004/0113450 A1 Jun. 17, 2004

Related U.S. Application Data

(60) Provisional application No. 60/398,221, filed on Jul. 24, 2002.

(51) Int. Cl.⁷ .............................................. B62D 25/00
(52) U.S. Cl. ....................................... 296/62; 280/166
(58) Field of Search ................. 296/62, 57.1; 280/166, 280/163, 164.1, 511; 182/91, 127, 89, 92, 206, 90; 293/117; 105/430, 487, 449

(56) References Cited

U.S. PATENT DOCUMENTS

| | | | | |
|---|---|---|---|---|
| 3,610,824 A | * | 10/1971 | Hansen et al. ............... | 358/476 |
| 3,655,109 A | * | 4/1972 | Stevens ....................... | 226/46 |
| 3,693,564 A | * | 9/1972 | Hsiao ......................... | 112/176 |
| 3,793,906 A | * | 2/1974 | Williams et al. .............. | 74/745 |
| 4,191,388 A | * | 3/1980 | Barksdale .................... | 296/62 |
| 4,264,084 A | * | 4/1981 | Telles ......................... | 280/166 |
| 4,393,768 A | * | 7/1983 | Barbour ....................... | 101/45 |
| 4,639,032 A | * | 1/1987 | Barbour ....................... | 296/62 |
| 4,846,487 A | * | 7/1989 | Criley ......................... | 296/62 |
| 4,848,821 A | * | 7/1989 | Llewellyn .................... | 296/62 |
| 5,028,063 A | * | 7/1991 | Andrews ...................... | 296/62 |
| 5,205,603 A | * | 4/1993 | Burdette, Jr. ................ | 296/62 |
| 5,261,779 A | * | 11/1993 | Goodrich ..................... | 414/546 |
| 5,312,150 A | * | 5/1994 | Quam .......................... | 296/62 |
| 5,421,633 A | | 6/1995 | Moore et al. | |
| 5,549,312 A | * | 8/1996 | Garvert ....................... | 296/62 |
| 5,617,930 A | * | 4/1997 | Elia ............................ | 296/62 |
| 5,687,813 A | * | 11/1997 | Bensch ........................ | 280/186 |
| 5,732,996 A | * | 3/1998 | Graffy et al. ................ | 296/62 |
| 5,788,311 A | * | 8/1998 | Tibbals ........................ | 296/62 |
| 5,816,638 A | * | 10/1998 | Pool, III ...................... | 296/62 |
| 5,820,193 A | * | 10/1998 | Straffon ....................... | 296/62 |
| 6,116,378 A | * | 9/2000 | Barrow ........................ | 296/62 |
| 6,270,139 B1 | * | 8/2001 | Simpson ...................... | 296/62 |
| 6,364,392 B1 | * | 4/2002 | Meinke ........................ | 296/62 |
| 6,422,342 B1 | * | 7/2002 | Armstrong et al. ........... | 296/62 |
| 6,454,338 B1 | * | 9/2002 | Glickman et al. ............ | 296/62 |
| 6,631,938 B1 | * | 10/2003 | Moore et al. ................ | 296/64 |
| 6,640,929 B2 | * | 11/2003 | Korpi .......................... | 182/127 |
| 2002/0070577 A1 | * | 6/2002 | Pool et al. ................... | 296/62 |
| 2002/0121760 A1 | * | 9/2002 | Puglisi ........................ | 280/163 |

OTHER PUBLICATIONS

Bed–Hopper® Folding Tailgate Step, JCWhitney.com web site.

* cited by examiner

*Primary Examiner*—Kiran Patel
(74) *Attorney, Agent, or Firm*—Thomas A. Jurecko

(57) ABSTRACT

A vehicle closure member with an integrated step is provided for improving access to a vehicle cargo area. The vehicle closure member also includes an internal cavity, an orifice positioned in the internal cavity, and a track mechanism disposed in the internal cavity that is in alignment with the orifice. The track mechanism engages the step member which slideably extends through the orifice and pivots to a deployed position to provide a step for access to the vehicle cargo area. An interlock assembly can be provided to prevent closing of the vehicle closure member when the step member is in the deployed position.

16 Claims, 3 Drawing Sheets

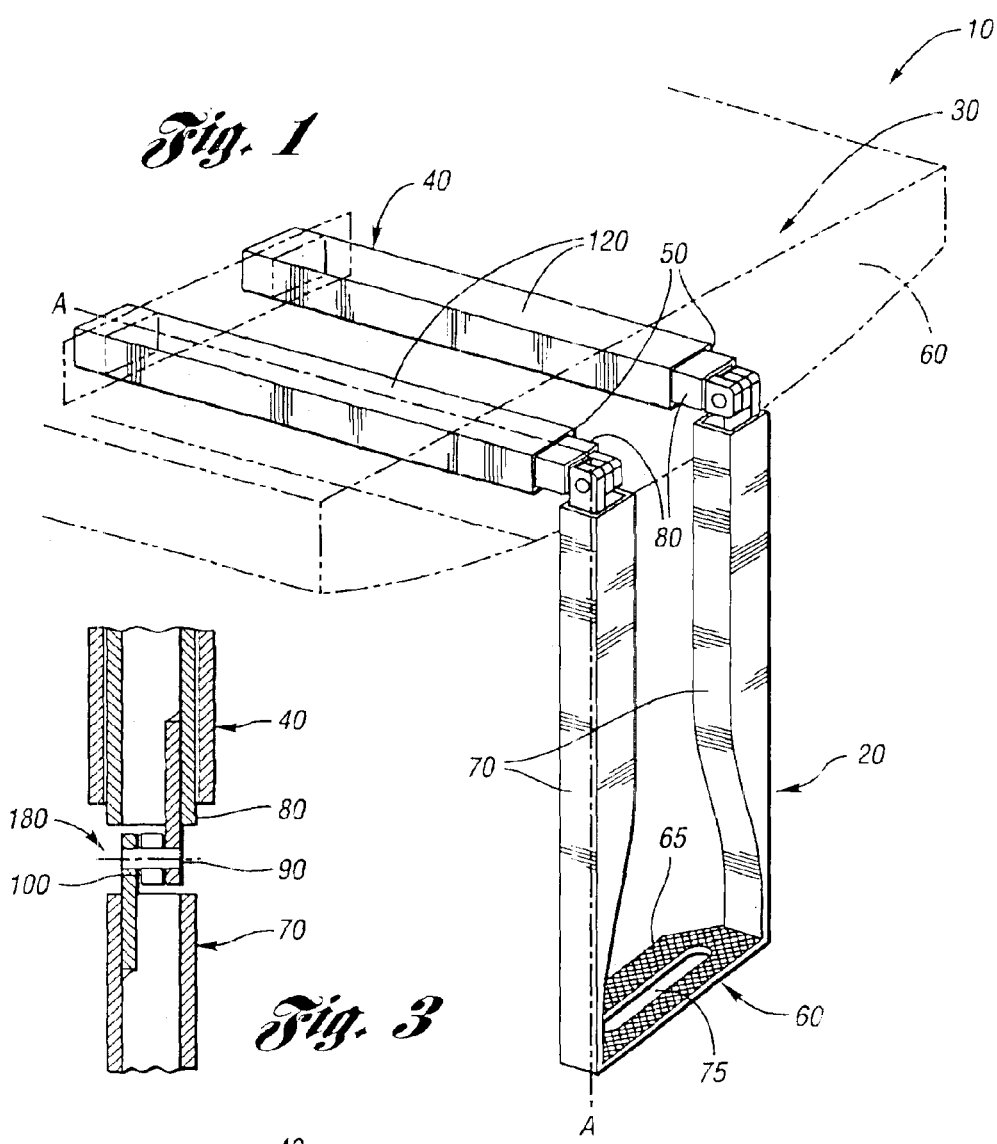

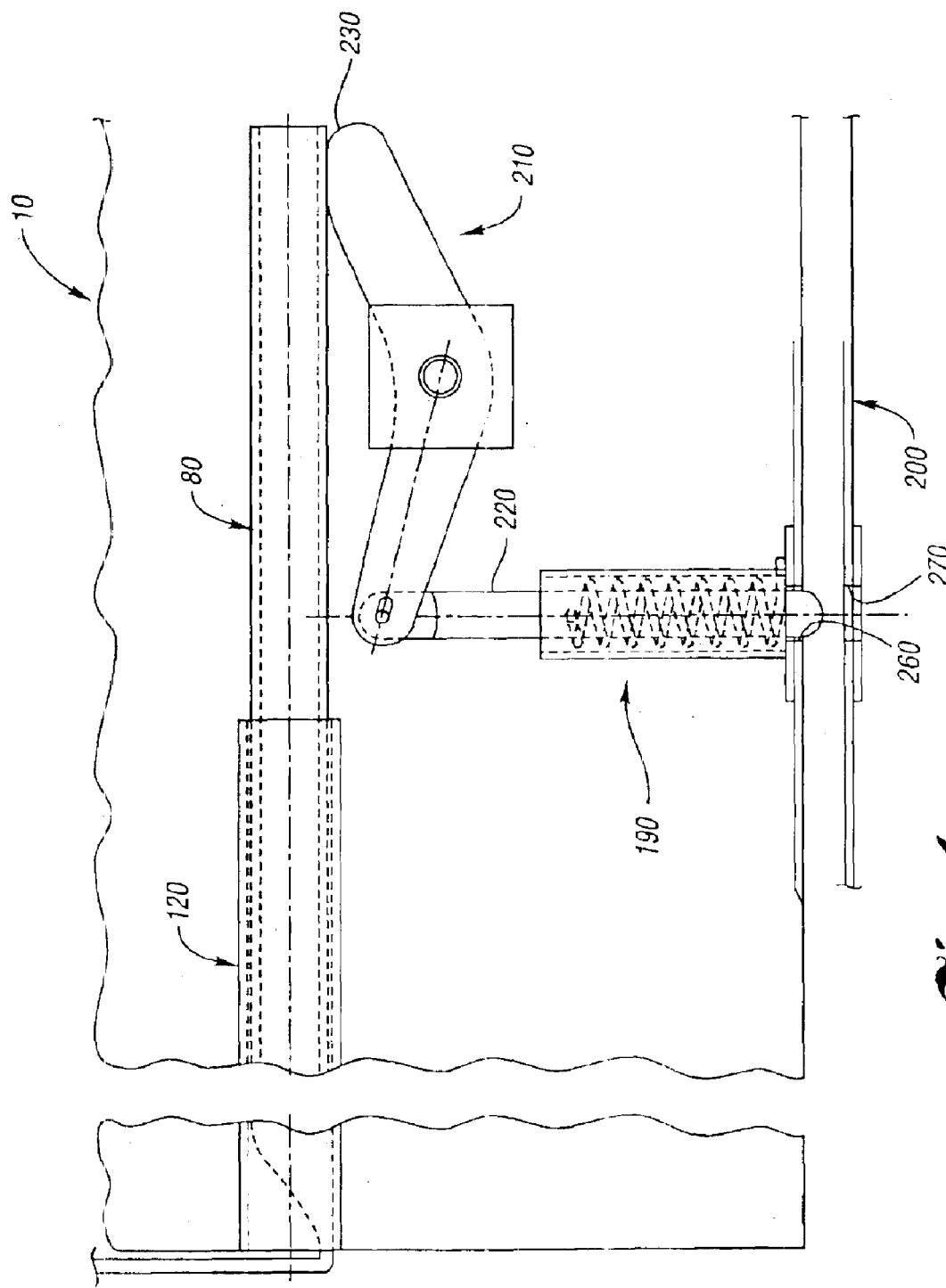

INTEGRATED STEP FOR A VEHICLE CARGO AREA

This application claims benefit of U.S. Provisional Application No. 60/398,221 filed Jul. 24, 2002.

FIELD OF THE INVENTION

The present invention relates in general to a step for a vehicle cargo area. More specifically, but without restriction to the particular embodiment and/or use which is shown or described for purposes of illustration, the present invention relates to an integrated vehicle step that can be selectively deployed from a stowed position.

BACKGROUND OF THE INVENTION

Generally, many current vehicle designs call for greater vehicle ground clearance. For example, a large percentage of the motor vehicles sold today consist of sport utility vehicles. Among these sport utility vehicles, factors such as larger tires and demand for off-road capability produce or require increased ground clearance. This increased ground clearance can be accomplished in numerous ways with the end result being that a cargo area of the vehicle is raised higher with respect to the ground. As an example, today's pick-up truck vehicles are commonly outfitted with twenty inch wheels, increased suspension system travel and four-wheel drive capability. Such features effectively raise the cargo box area relative to the ground, potentially making it more difficult to access (i.e., ingress/egress) the cargo area.

SUMMARY OF THE INVENTION

Accordingly, the present invention provides an integrated step assembly for improving access to a vehicle cargo area. In accordance with one aspect of the present invention, a vehicle closure member hingeably connected to a vehicle is provided. The vehicle closure member includes an internal cavity, an orifice and a track mechanism disposed in the internal cavity and in alignment with the orifice. The track mechanism engages a step member which slideably extends through the orifice and pivots to a deployed position to provide a step for access to the vehicle cargo area. Finally, an interlock assembly is arranged to prevent closing of the vehicle closure member when the step member is in the deployed position.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

Other aspects, features, and advantages of the present invention will become more fully apparent from the following detailed description of the preferred embodiment, the appended claims, and in the accompanying drawings in which:

FIG. 1 is a perspective view of an open closure member with a deployed step member assembly in accordance with the present invention;

FIG. 2 is a perspective view of a track mechanism guide track in accordance with the present invention;

FIG. 3 is a sectional view through the track mechanism and a step member leg in accordance with the present invention;

FIG. 4 is a plan view of an interlock assembly in a retracted position in accordance with the present invention.

DETAILED DESCRIPTION OF THE PREFERRED EMBODIMENT

Figure 5:
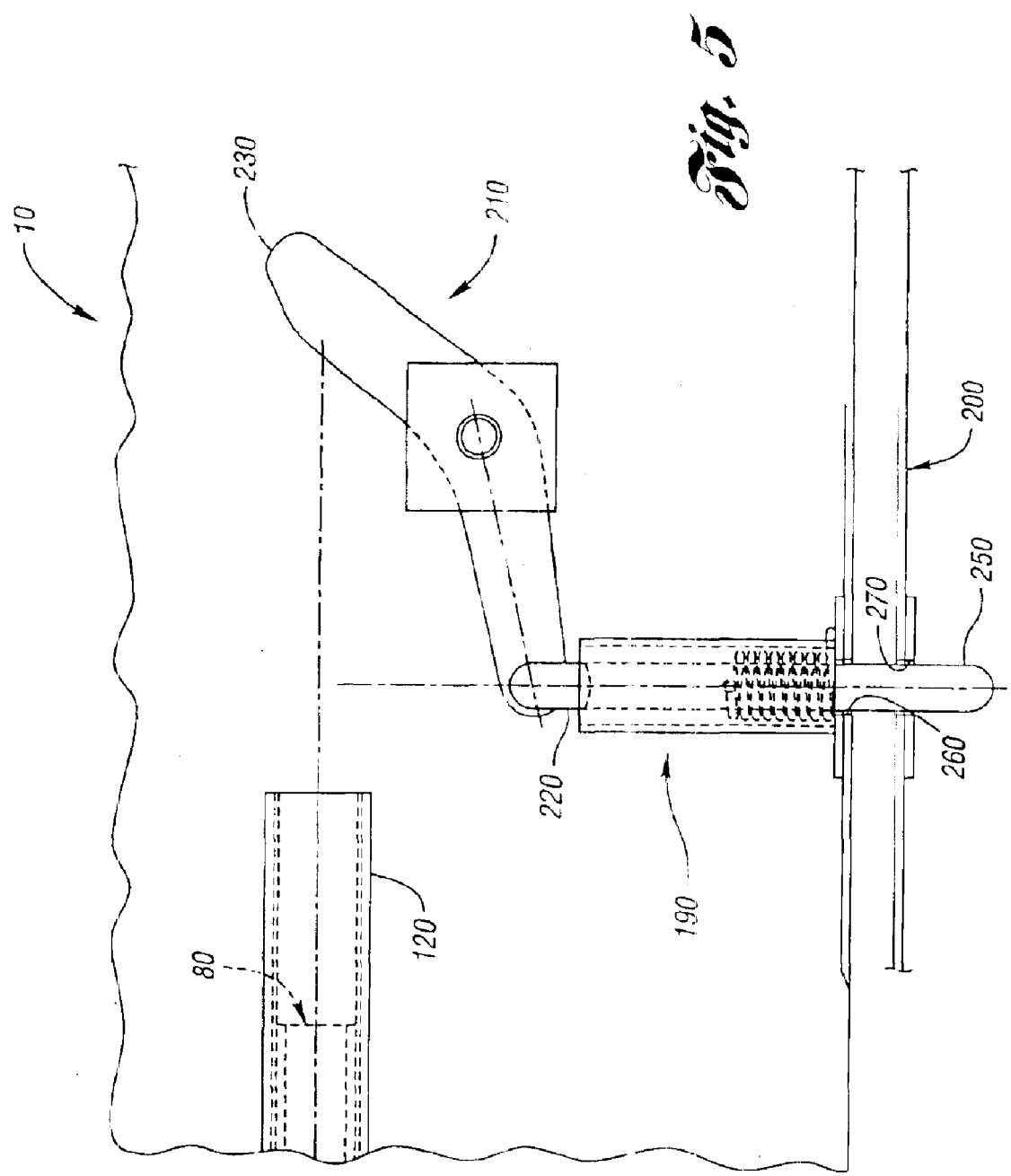
FIG. 5 is a plan view of the interlock assembly in a translated position in accordance with the present invention.

Referring now to the drawings, FIG. 1 illustrates a perspective view of a vehicle closure member 10 in a generally open horizontal position and a step member assembly 20 in a deployed generally vertical position. The vehicle closure member 10 contains an internal cavity 30 where the step member assembly 20 can be stored in a stowed position. A track mechanism 40 is housed in the closure member internal cavity 30 and is in alignment with two openings 50 in a closure panel surface 160 which together allow the step member assembly 20 to slideably extend from a stowed position in the internal cavity to the deployed position as shown in FIG. 1.

As shown in FIGS. 1, 2 and 3, each leg of the step member assembly 20 includes a bottom step plate 60, an inward leg portion 80, an outward leg portion 70, a pivot pin 90, a pivot bushing 100, and a stop pin 110. In the exemplary embodiment shown, the two inward leg portions 80 are joined via pivot pin 90 and bushing 100 to the two outward leg portions 70 as shown in FIG. 3. Bottom step late 60 joins the two outward leg portions 70 thereby forming a U-shaped step. Step plate 60 also includes a non-skid surface 65 and a hand access hole 75 to allow the step member assembly 20 to be easily pulled away and deployed from the closure member 10.

The track mechanism 40 is shown in FIGS. 1 and 2. Track Mechanism 40 includes two guide tracks 120 which slideably engage the step member inward and outward leg portions 80 and 70, respectively. The guide tracks 120 further include a retention slot 130 confined between the internal end 140 and the external end 150 of the guide tracks 120. The retention slot 130 engages step member stop pin 110 and prevents the step member assembly 20 from separating from the closure member 10. The guide tracks 120 have a length less than the combined length of the housed leg portion 80 and the pivoting leg portion 70, but long enough to house the pivoting leg portion 70 and part of the housed leg portion 80 such that in the stowed position the housed leg portion 80 will extend beyond the guide track internal end 140 as shown in FIG. 3.

Once the step member 20 has been horizontally extended from the closure member 10 and the stop pins 110 reach an outboard travel limit 170, a pivot assembly 180 allows the outward leg portions 70 to pivot down to a substantially vertical position as shown in FIG. 1. It will be appreciated by one of ordinary skill in the art that the pivot assembly 180 can be configured to limit downward rotation of the outward leg portions 70 to less than a full vertical position so that the step member assembly 20 is easier seen by someone exiting a cargo area of a vehicle. Furthermore, the inward leg portions 80 are of a length to extend beyond the closure member surface 160 during deployment so as to not contact surface 160 upon pivoting to a generally vertical position. Finally, it should be noted that with respect to the exemplary embodiment shown in its stowed position, the step member assembly 20 is completely stored within the closure member 10 with the bottom step plate 60 contiguous to closure member surface 160. Therefore, the step member assembly is not visibly apparent when the step member assembly 20 is in its stowed position and the closure member 10 is in a closed position.

In the deployed position, the step member assembly may be beyond the line of sight of someone attempting to close the vehicle cargo area closure member 10. An attempt to close the closure member 10 without first stowing the step member assembly 20 could result in cosmetic damage to the exterior of the vehicle. Therefore, in accordance with the present invention, a closure member interlock assembly 190 is provided to lock the closure member in an open position when the step member assembly 20 is deployed as shown in FIGS. 4 and 5. When the step member assembly 20 is pulled away from its stowed position in the closure member 10, the inward leg portion 80 disengages contact with an end 230 of a bell crank lever arm 210 which is rotateably connected to a spring loaded interlock shaft 220. When the inward leg portion 80 disengages contact with end 230 of lever arm 210, the pre-loaded spring causes the interlock shaft to translate to an extended position 250 through hole 260 in closure member 10 then through an adjacent hole 270 in a vehicle structural member 200 as shown in FIG. 5. This engagement prevents the closure member 10 from being closed until the step member assembly 20 is returned to its stowed position. Returning step member 20 to its stowed position causes internal leg portion 80 to engage end 230 of bell crank lever arm 210 and retract interlock shaft 220 into the closure member 10 to a non-translated position 240 as shown in FIG. 4.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A vehicle closure member hingeably connected to a vehicle and arranged to pivot to a generally open horizontal position, the closure member comprising:
   an internal cavity formed therein;
   at least one orifice positioned in an external surface of the closure member;
   a track mechanism disposed in the internal cavity in alignment with the at least one orifice;
   a step member engaged with the track mechanism and arranged to slideably extend through the orifice and pivot to a deployed position to provide a vehicle step when the closure member is in the generally open horizontal position; and
   an interlock assembly engageable by the step member and arranged to prevent closing of the vehicle closure member when the step member is in the deployed position.

2. The closure member of claim 1, wherein the step member comprises:
   a first leg having an inboard portion and an outboard portion;
   a second leg having an inboard portion and an outboard portion, wherein the first and second legs are arranged to interface with the at least one orifice; and
   a joining segment, wherein the joining segment is arranged to connect the first and second outboard leg portions thereby forming a continuous U-shaped step member.

3. The closure member of claim 2, wherein hinges are incorporated into the first and second step member leg portions hingeably connecting the inboard and outboard portions of each step member leg, the hinges are arranged to slide in and out of the internal cavity in conjunction with each respective leg, and allow the respective outboard portions to pivot from a generally horizontal extended position to a generally vertical position as the hinges move out of the internal cavity when the step member is deployed.

4. The closure member of claim 3, wherein the hinges are positioned to provide clearance to the closure member when the step member is deployed and pivoted to the generally vertical position.

5. The closure member of claim 2, wherein the distance from the step member joining segment in a generally vertical deployed position to the ground is half the distance from the closure member in the generally open horizontal position to the ground.

6. The closure member of claim 2, wherein the joining segment when in the deployed position is substantially parallel to the ground.

7. The closure member of claim 2, wherein the joining segment is positioned contiguous to and substantially flush to the closure member when the step member is in a stowed position.

8. The closure member of claim 2, wherein the joining segment further includes an access hole to facilitate deployment of the step member.

9. The closure member of claim 2, further comprising:
   at least one stop pin attached to the inboard leg portion of at least one of the first and second step member leg inboard leg portions, wherein the at least one stop pin is arranged to engage the at least one retention slot positioned in the at least one track to prevent the first and second step member inboard leg portions from extending beyond the external end of the track when the step member is deployed from the closure member.

10. The closure member of claim 1, wherein the step member is arranged to pivot 90 degrees from a generally horizontal position to a generally vertical position.

11. The closure member of claim 1, wherein the track mechanism comprises:
   a first track; and
   a second track each having an end positioned in the internal cavity to interface with the at least one orifice.

12. The closure member of claim 11, wherein each of the first and second tracks have a length greater than the first and second step member outboard leg portions.

13. The closure member of claim 11, wherein the step member inboard and outboard leg portions are slideably engaged with the respective first and second tracks.

14. The closure member of claim 11, wherein the track mechanism further comprises a retention slot positioned in at least one of the first and second tracks, the retention slot being confined by the internal and external ends of the at least one of the first and second tracks.

15. The closure member of claim 1, wherein the step member assembly is concealed in its stowed position when the closure member is in the closed position.

16. The closure member of claim 1, wherein the interlock assembly further comprises:
   a bell crank lever arm; and
   a spring loaded interlock shaft biased to a non-translated position, the bell crank lever arm is engageable by a step member leg portion and is arranged to translate the interlock shaft through a hole in the closure member into an adjacent hole in the vehicle thereby locking the vehicle closure member in the generally open horizontal position when the step member is in the deployed position.

* * * * *